(12) United States Patent
Chikagawa

(10) Patent No.: US 10,293,656 B2
(45) Date of Patent: May 21, 2019

(54) VEHICLE AIR CONDITIONING DEVICE

(75) Inventor: Noriyuki Chikagawa, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 593 days.

(21) Appl. No.: 13/521,509

(22) PCT Filed: Jun. 3, 2011

(86) PCT No.: PCT/JP2011/062839
§ 371 (c)(1),
(2), (4) Date: Jul. 11, 2012

(87) PCT Pub. No.: WO2011/155414
PCT Pub. Date: Dec. 15, 2011

(65) Prior Publication Data
US 2012/0280051 A1 Nov. 8, 2012

(30) Foreign Application Priority Data
Jun. 9, 2010 (JP) .................................. 2010-132117

(51) Int. Cl.
*B60H 1/00* (2006.01)
(52) U.S. Cl.
CPC ..... *B60H 1/00521* (2013.01); *B60H 1/00528* (2013.01)
(58) Field of Classification Search
CPC ........................ B60H 1/00521; B60H 1/00528
(Continued)

(56) References Cited

U.S. PATENT DOCUMENTS 4,140,177 A * 2/1979 Ivie, Sr. ................. B60K 11/04
165/134.1
5,995,711 A * 11/1999 Fukuoka ............ B60H 1/00328
219/202
(Continued)

FOREIGN PATENT DOCUMENTS

CN 101454169 A 6/2009
DE 600 29 667 T2 12/2006
(Continued)

OTHER PUBLICATIONS

Valeo Thermal Systems Japan Corp., JP 2007-1329 A English machine translation, Jan. 11, 2007.*
(Continued)

*Primary Examiner* — Gregory L Huson
*Assistant Examiner* — Phillip Decker
(74) *Attorney, Agent, or Firm* — Westerman, Hattori, Daniels & Adrian, LLP

(57) ABSTRACT

Provided is a vehicle air conditioning device, including: a unit case including an air flow channel formed therein, the air flow channel being branched into a bypass flow channel and a heating flow channel; a heater core installed in the heating flow channel; and upper-part shoulder supporting portions for the heater core, each of the upper-part shoulder supporting portions only supports one of upper-part right and left shoulder portions of the heater core installed on a bottom surface side of the heating flow channel, each of the upper-part shoulder supporting portions is provided on one of right and left side surfaces of the unit case. The vehicle air conditioning device blowing off, into a chamber, an air flow made after joining together an air flow that has passed through the heating flow channel and an air flow that has passed through the bypass flow channel.

1 Claim, 6 Drawing Sheets

(58) Field of Classification Search
USPC .................................................. 237/12.3 R
See application file for complete search history.

(56) References Cited

U.S. PATENT DOCUMENTS

| | | | | |
|---|---|---|---|---|
| 6,129,140 | A * | 10/2000 | Kawahara | B60H 1/00521 165/42 |
| 6,305,462 | B1 * | 10/2001 | Tsurushima | B60H 1/0005 237/12.3 B |
| 6,382,305 | B1 * | 5/2002 | Sano | B60H 3/0608 165/103 |
| 6,412,581 | B2 * | 7/2002 | Enomoto | B60K 11/04 165/69 |
| 6,513,579 | B1 * | 2/2003 | Kent | F28F 9/002 165/67 |
| 6,609,563 | B1 | 8/2003 | Tsurushima et al. | |
| 6,675,921 | B2 * | 1/2004 | Brown | B60K 11/04 165/67 |
| 6,901,992 | B2 * | 6/2005 | Kent | F28F 9/002 165/67 |
| 7,040,380 | B1 * | 5/2006 | O'Brien | F28F 9/002 165/149 |
| 7,117,927 | B2 * | 10/2006 | Kent | F28F 9/002 165/67 |
| 8,011,420 | B2 * | 9/2011 | Mazzocco et al. | 165/67 |
| 8,522,860 | B2 * | 9/2013 | Kersting | B60H 1/00521 165/67 |
| 8,544,528 | B2 * | 10/2013 | Seto et al. | 165/42 |
| 2002/0056541 | A1 * | 5/2002 | Kokubunji | B60K 11/04 165/67 |
| 2003/0145978 | A1 | 8/2003 | Tsurushima et al. | |
| 2004/0069480 | A1 * | 4/2004 | Yamamoto | B60H 1/00528 165/202 |
| 2008/0223550 | A1 * | 9/2008 | Kersting et al. | 165/67 |
| 2011/0005714 | A1 * | 1/2011 | Katsuki et al. | 165/61 |
| 2013/0014913 | A1 * | 1/2013 | Hara | B60H 1/00678 165/103 |
| 2014/0373565 | A1 * | 12/2014 | Melbostad | B60H 1/00371 62/244 |

FOREIGN PATENT DOCUMENTS

| | | |
|---|---|---|
| EP | 2025537 A1 | 2/2009 |
| FR | 2735724 A1 | 12/1996 |
| GB | 662736 A | 12/1951 |
| JP | 2001113930 A * | 4/2001 |
| JP | 2002-307933 A | 10/2002 |
| JP | 2003-307933 A | 10/2003 |
| JP | 2004-136712 A | 5/2004 |
| JP | 2004-224180 A | 8/2004 |
| JP | 2006-168432 A | 6/2006 |
| JP | 2007-001329 A | 1/2007 |
| JP | 2007-320372 A | 12/2007 |

OTHER PUBLICATIONS

Office Action dated Dec. 3, 2013, issued in corresponding German application No. 112011101965.3, w/ English translation.
Decision to Grant a Patent dated Nov. 11, 2014, issued in corresponding Japanese Patent Application No. 2010-132117 (3 pages) "The Decision to Grant a Patent has been recieved".
Office Action dated Mar. 19, 2014, issued in Chinese Patent Applcation No. 201180007705.0 with English Translation (10 pages).
International Search Report of PCT/JP2011/062839, dated Aug. 30, 2011.
Notice of Allowance dated Apr. 29, 2015, issued in corresponding Chinese Patent Application No. 201180007705.0 (2 pages). Explanaton of relevance—"The Notice of Allowance has been received.".
Office Action dated Nov. 11, 2016, issued in German Application No. 11 2011 101 965.3, with English translation (9 pages).

* cited by examiner

PRIOR ART

VEHICLE AIR CONDITIONING DEVICE

TECHNICAL FIELD

The present invention relates to a vehicle air conditioning device including a unit case in which a heater core is installed.

BACKGROUND ART

In a heating ventilation and air conditioning unit (HVAC unit) of an air conditioning device mounted in a vehicle, an evaporator, an air mixing damper, a heater core, and the like are sequentially provided from the upstream side in an air flow channel in a unit case. Temperature-conditioned air having temperature conditioned by those components is selectively blown off by means of a plurality of blow-off mode switching dampers into a chamber from any of a face blow-off channel, a foot blow-off channel, and a defroster blow-off channel that are provided downstream of those components.

The air flow channel is branched into a bypass flow channel and a heating flow channel, downstream of the evaporator, and the heater core is disposed in the heating flow channel. The flow ratio of air flows divided into the bypass flow channel and the heating flow channel can be adjusted by the air mixing damper, and the air flow that has passed through the bypass flow channel and the air flow that has passed through the heater core join together in a region downstream of the air mixing damper, whereby temperature-conditioned air having a set temperature is obtained.

The heater core is installed on a bottom surface side of the unit case so as to run across the heating flow channel, and an entire surface of an upper part of the heater core is supported by upper-part supporting portions for the heater core, which are extended over the entire width in the width direction of the unit case from right and left side surfaces of the unit case. The upper-part supporting portions for the heater core define an air flow channel in a region above the heater core (see, for example, PTL 1, PTL 2, and PTL 3).

CITATION LIST

Patent Literature

{PTL 1} Japanese Unexamined Patent Application, Publication No. 2002-307933
{PTL 2} Japanese Unexamined Patent Application, Publication No. 2004-224180
{PTL 3} Japanese Unexamined Patent Application, Publication No. 2006-168432

SUMMARY OF INVENTION

Technical Problem

As described above, in a conventional HVAC unit, as illustrated in FIG. 5 and FIG. 6, an entire surface of an upper part of a heater core 104, which is installed on a bottom surface 103 of a heating flow channel 102 formed in a unit case 101, is supported by upper-part supporting portions 107 and 108 for the heater core, which are extended over the entire width in the width direction of the unit case 101 from left and right side surfaces 105 and 106 of the unit case 101. Accordingly, the upper-part supporting portions 107 and 108 for the heater core each having a length at least half the length in the width direction of the unit case 101 need to be respectively formed integrally with the left and right side surfaces 05 and 06 of the unit case 101.

The upper-part supporting portions 107 and 108 for the heater core each have a large length in the width direction, and the draft angle thereof for resin molding needs to be set to a large value, resulting in an increase in thickness of a root portion. In addition, cooling time of the upper-part supporting portions 107 and 108 for the heater core increases. Consequently, the configuration of the unit case 101 is more complicated, and the formability and productivity thereof decrease. In addition, the presence of the upper-part supporting portions 107 and 108 for the heater core increases a distance between a rotating shaft 110 of an air mixing damper 109 and the heater core 04, so that the size of the unit case 101, eventually, the size of the HVAC unit is unfavorably increased accordingly.

The present invention, which has been made in view of the above-mentioned circumstances, has an object to provide a vehicle air conditioning device that can simplify the configuration of a unit case, facilitate the formation thereof, and reduce the weight and costs thereof by reducing the amount of used resin, and further can make an HVAC unit compact and reduce the weight thereof.

Solution to Problem

In order to solve the above-mentioned problems, an air regulating device for a vehicle of the present invention adopts the following solutions.

That is, a vehicle air conditioning device according to the present invention includes: a unit case including an air flow channel formed therein, the air flow channel being branched into a bypass flow channel and a heating flow channel; a heater core installed in the heating flow channel; and upper-part shoulder supporting portions for the heater core, each of the upper-part shoulder supporting portions only supports one of upper-part right and left shoulder portions of the heater core installed on a bottom surface side of the heating flow channel, each of the upper-part shoulder supporting portions is provided on one of right and left side surfaces of the unit case. The vehicle air conditioning device blows off, into a chamber, an air flow made after joining together an air flow that has passed through the heating flow channel and an air flow that has passed through the bypass flow channel.

According to the present invention, in the vehicle air conditioning device including the heater core that is installed in the heating flow channel in the unit case, the upper-part shoulder supporting portions for the heater core, each of the upper-part shoulder supporting portions only supports one of the upper-part right and left shoulder portions of the heater core installed on the bottom surface side of the heating flow channel, each of the upper-part shoulder supporting portions is provided on one of the right and left side surfaces of the unit case. Hence, an upper part of the heater core is supported by the upper-part shoulder supporting portions for the heater core that are respectively provided on the right and left side surfaces of the unit case and support only the upper-part right and left shoulder portions. With this configuration, the heater core can be placed and fixedly supported at a predetermined position in the heating flow channel in the state where at least four shoulder portions thereof are supported. Accordingly, without the need to provide, on the side surfaces of the unit case, a wall that is extended over the entire length in the width direction and supports an entire surface of the upper part of the heater core, the heater core can be fixedly installed reliably in the heating flow channel. As a result, it is possible to simplify the configuration of the unit case, facilitate the formation thereof, and reduce the weight and costs thereof by reducing the amount of used resin. In addition, because the wall that supports the entire surface of the upper part of the heater core is not necessary, the heater core and an air mixing damper can be made closer to each other, so that the size of the unit case, eventually, the size of an HVAC unit can be reduced accordingly in each of the top-bottom direction and the front-back direction. As a result, it is possible to make the unit compact and reduce the weight thereof.

According to a vehicle air conditioning device of a first aspect of the present invention, in the above-mentioned vehicle air conditioning device, the upper-part shoulder supporting portions for the heater core are respectively formed integrally with the right and left side surfaces of the unit case.

According to the vehicle air conditioning device of the first aspect of the present invention, the upper-part shoulder supporting portions for the heater core are respectively formed integrally with the right and left side surfaces of the unit case. Hence, it is sufficient to integrally form, in the unit case, the upper-part shoulder supporting portions for the heater core that respectively support only the upper-part right and left shoulder portions of the heater core, instead of a supporting portion that supports the entire surface of the upper part of the heater core, and a portion having a large thickness does not need to be provided in the root portion. As a result, the draft angle thereof can be made closer to 0°, and cooling time during the formation can be shortened. Accordingly, it is possible to facilitate the formation of the unit case using a resin material and improve the productivity thereof.

According to a vehicle air conditioning device of a second aspect of the present invention, in any of the above-mentioned air regulating devices for a vehicle, each of the upper-part shoulder supporting portions for the heater core includes C-channel-shaped holding surfaces that hold an upper surface, an end surface, and front and back side surfaces of one of the upper-part right and left shoulder portions of the heater core.

According to the vehicle air conditioning device of the second aspect of the present invention, each of the upper-part shoulder supporting portions for the heater core includes the C-channel-shaped holding surface that holds the upper surface, the end surface, and the front and back side surfaces of one of the upper-part right and left shoulder portions of the heater core. Hence, the upper surface, the end surface, and the front and back side surfaces of one of the upper-part right and left shoulder portions of the heater core are respectively held by the C-channel-shaped holding surfaces of the upper-part shoulder supporting portions for the heater core, whereby the upper part of the heater core can be supported by the two side surfaces of the unit case. Accordingly, the heater core can be fixedly supported reliably at the predetermined position in the heating flow channel, even without the supporting wall that supports the entire surface of the upper part of the heater core.

Advantageous Effects of Invention

According to the present invention, the upper part of the heater core is supported by the upper-part shoulder supporting portions for the heater core that are respectively provided on the right and left side surfaces of the unit case and support only the upper-part right and left shoulder portions. With this configuration, the heater core can be placed and fixedly supported at the predetermined position in the heat-ing flow channel in the state where at least the four shoulder portions thereof are supported. Accordingly, without the need to provide, on the side surfaces of the unit case, the wall that is extended over the entire length in the width direction and supports the entire surface of the upper part of the heater core, the heater core can be fixedly installed reliably in the heating flow channel. As a result, it is possible to simplify the configuration of the unit case, facilitate the formation thereof, and reduce the weight and costs thereof by reducing the amount of used resin. In addition, because the wall that supports the entire surface of the upper part of the heater core is not necessary, the heater core and the air mixing damper can be made closer to each other, so that the size of the unit case, eventually, the size of the HVAC unit can be reduced accordingly in each of the top-bottom direction and the front-back direction. As a result, it is possible to make the unit compact and reduce the weight thereof.

DESCRIPTION OF EMBODIMENTS

Hereinafter, an embodiment of the present invention is described with reference to FIG. 1 to FIG. 4.

Figure 1:
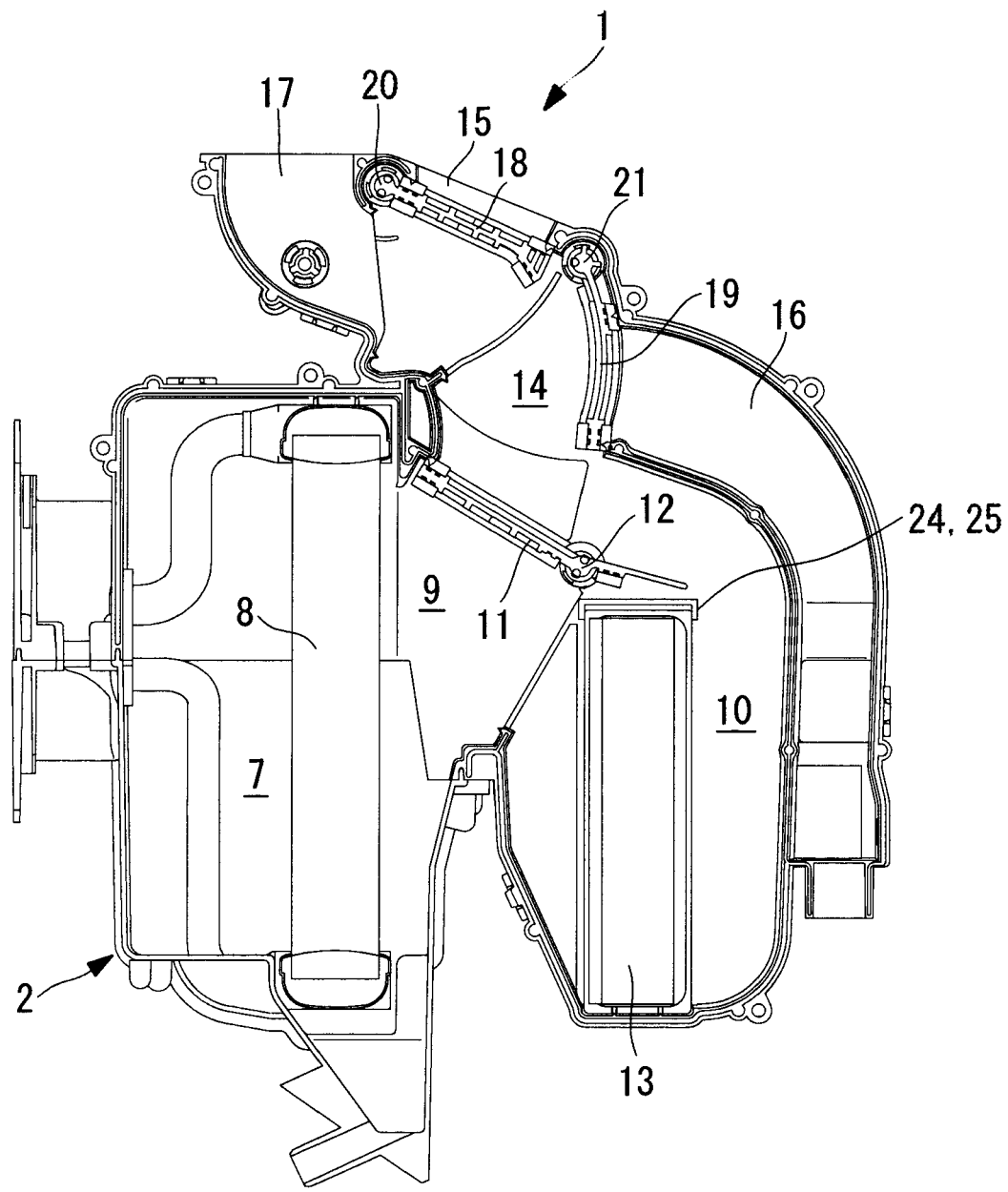
FIG. 1 is a longitudinal sectional view of a vehicle air conditioning device according to an embodiment of the present invention.
Figure 2:
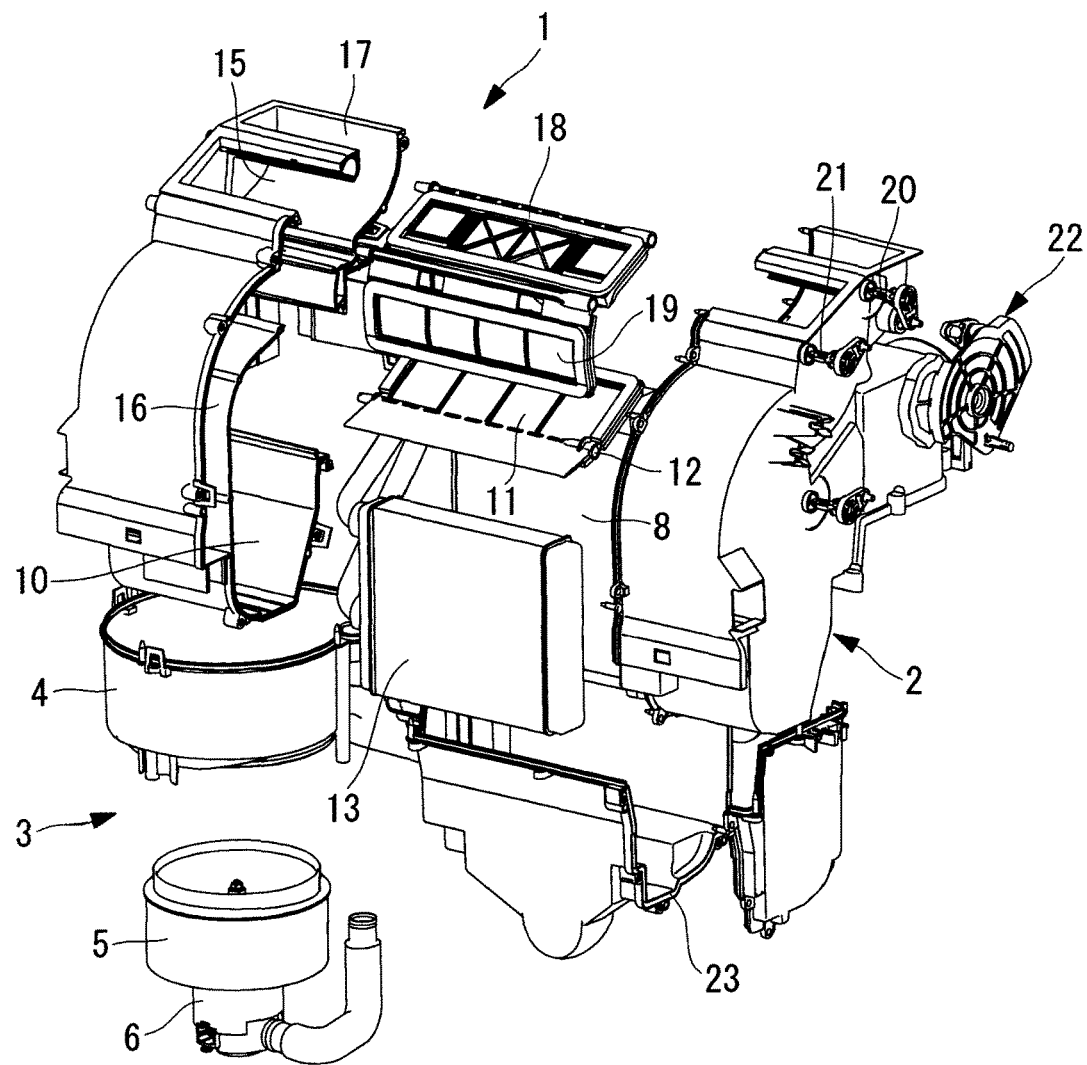
FIG. 2 is an exploded perspective view of the vehicle air conditioning device of FIG. 1, which is observed from a heater core side.

FIG. 1 illustrates a longitudinal sectional view of a vehicle air conditioning device (HVAC unit) according to the embodiment of the present invention, and FIG. 2 illustrates an exploded perspective view of the HVAC unit, which is observed from a heater core side.

A vehicle air conditioning device (heating ventilation and air conditioning unit; HVAC unit) 1 includes a unit case 2 made of a resin, and the unit case 2 is configured by integrally coupling a plurality of divided cases formed by vertically and horizontally dividing the unit case 2.

An air flow channel 7 is formed in the unit case 2. The air flow channel 7 changes the direction of an air flow fed from a blower unit 3 into the front-back direction (the right-left direction of FIG. 1), and circulates the air flow to the downstream side. The blower unit 3 includes a fan case 4, an impeller 5, and a fan motor 6 that are provided to a side portion in the unit case 2. An evaporator 8 is substantially vertically provided upstream of the air flow channel 7, and the evaporator 8 constitutes a refrigeration cycle (not illustrated).

The air flow channel 7 is branched into a bypass flow channel 9 and a heating flow channel 10, downstream of the evaporator 8. An air mixing damper 11 is provided at the branched portion into the bypass flow channel 9 and the heating flow channel 10 so as to be rotatable around a rotating shaft 12. The air mixing damper 11 enables the adjustment of a flow ratio of air flows to be circulated into the bypass flow channel 9 and the heating flow channel 10.

A heater core 13 is substantially vertically provided in the heating flow channel 10, and cooling water from an engine cooling water circuit (not illustrated) is circulated in the heater core 13.

The bypass flow channel 9 and the heating flow channel 10 join together in an air mixing region 14 downstream of the air mixing damper 11, and are communicated with three blow-off channels formed downstream of the air mixing region 14, that is, a face blow-off channel 15, a foot blow-off channel 16, and a defroster blow-off channel 17. A defroster/face damper 18 for switching the blow-off mode is provided between the face blow-off channel 15 and the defroster blow-off channel 17. In addition, a foot damper 19 for switching the blow-off mode is provided at an entrance of the foot blow-off channel 16.

As illustrated in FIG. 1, the defroster/face damper 18 can be rotated around a rotating shaft 20 between: a position at which the defroster/face damper 18 fully closes the face blow-off channel 15; and a position at which the defroster/face damper 18 fully closes the defroster blow-off channel 17. Meanwhile, the foot damper 19 can be rotated around a rotating shaft 21 between: a position at which the foot damper 19 fully closes the foot blow-off channel 16; and a position at which the foot damper 19 fully closes a flow channel leading to the face blow-off channel 15 and the defroster blow-off channel 17. The defroster/face damper 18 and the foot damper 19 can be each rotated by a link mechanism 22 to a selected blow-off mode position, and the link mechanism 22 includes: levers that are respectively coupled to shaft ends of the rotating shafts 20 and 21; and a link.

That is, the blow-off mode of temperature-conditioned air that is blown off into a chamber can be selectively switched by opening/closing the two defroster/face damper 18 and foot damper 19, among five blow-off modes of: a face mode in which the temperature-conditioned air is blown off from the face blow-off channel 15; a bi-level mode in which the temperature-conditioned air is blown off from both the face blow-off channel 15 and the foot blow-off channel 16; a foot mode in which the temperature-conditioned air is blown off from the foot blow-off channel 16; a defroster/foot mode in which the temperature-conditioned air is blown off from both the foot blow-off channel 16 and the defroster blow-off channel 17; and a defroster mode in which the temperature-conditioned air is blown off from the defroster blow-off channel 17.

Figure 3:
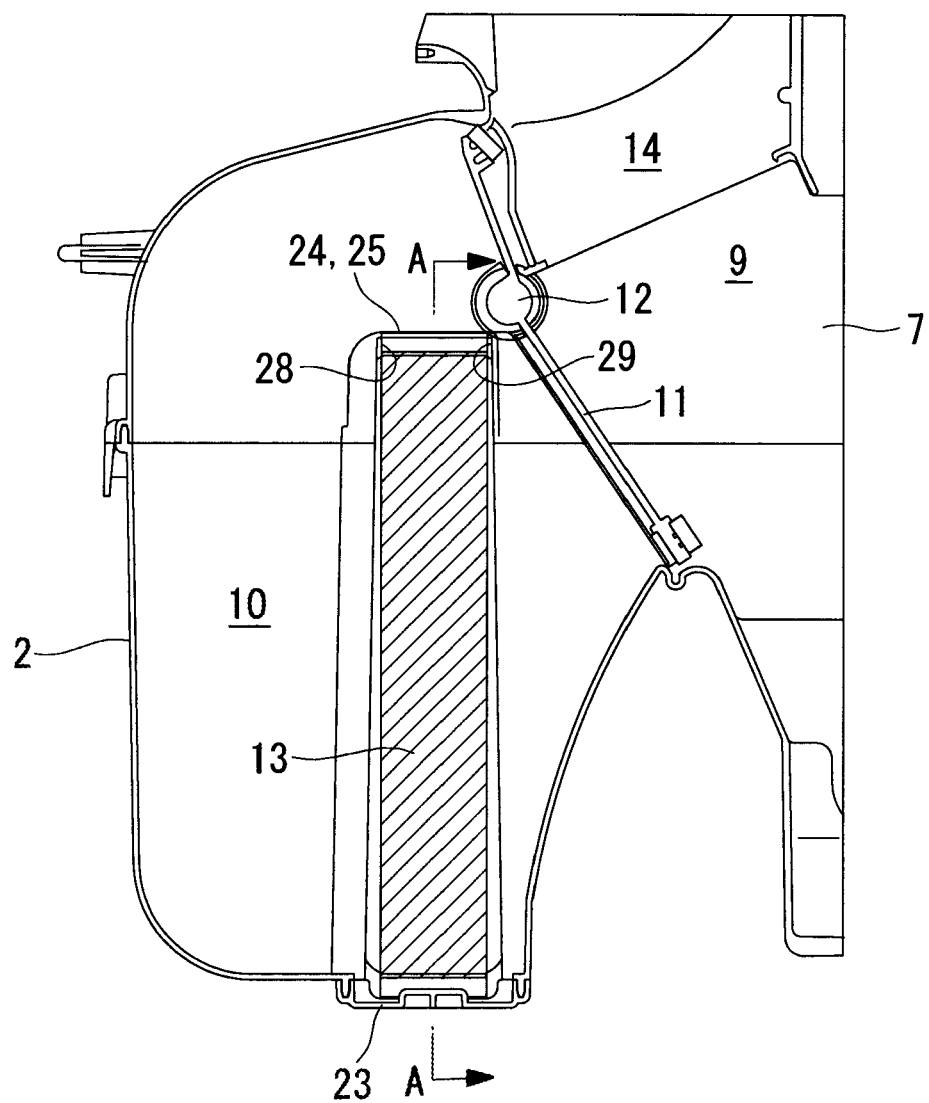
FIG. 3 is a longitudinal sectional view around the heater core of the vehicle air conditioning device of FIG. 2.
Figure 4:
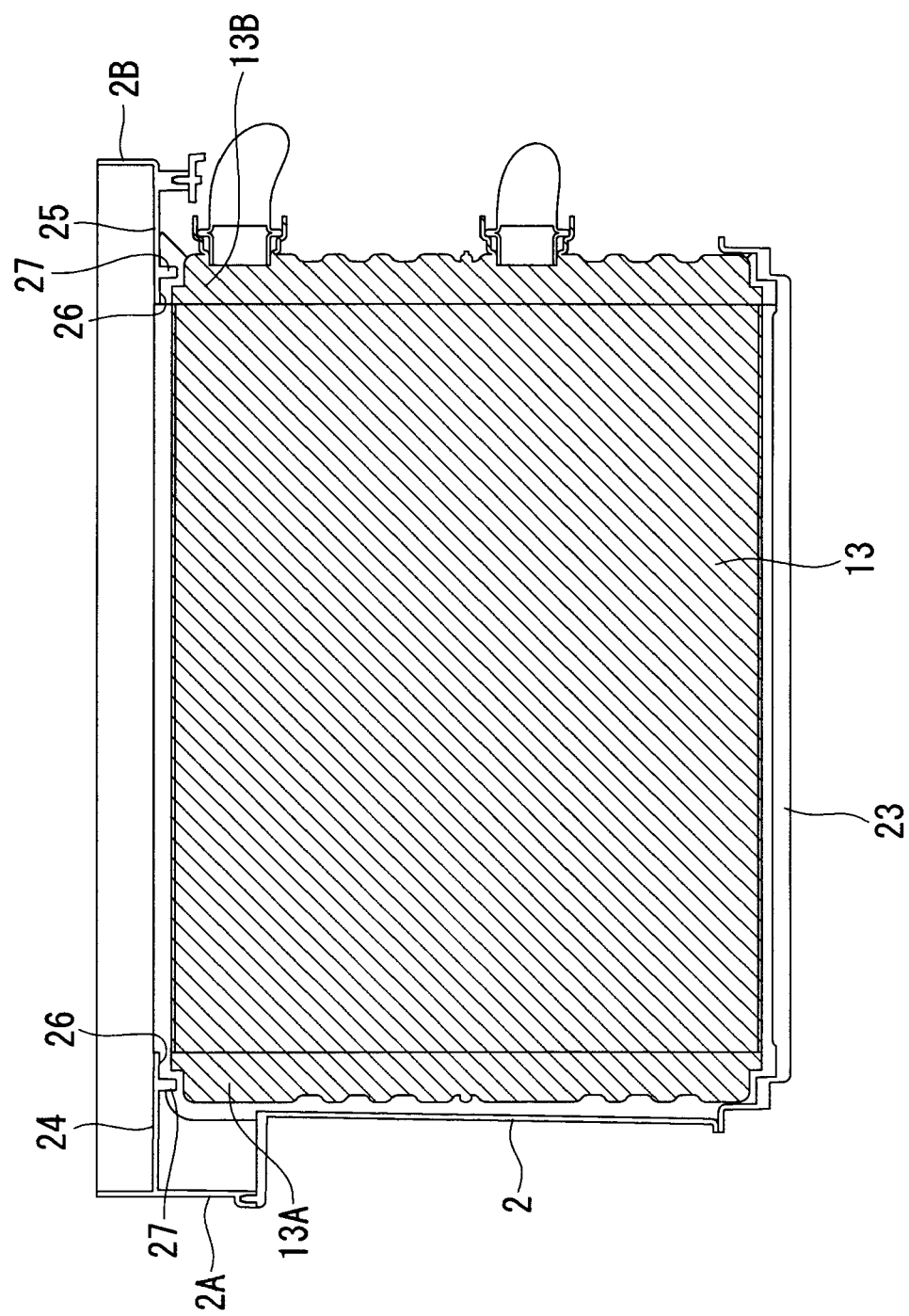
FIG. 4 is a sectional view taken along a line A-A in FIG. 3.

As described above, the heater core 13 is substantially vertically disposed in the heating flow channel 10 in the unit case 2 so as to run across the heating flow channel 10. More specifically, as illustrated in FIG. 3 and FIG. 4, the heater core 13 is installed in the following state. That is, a lower part of the heater core 13 is placed on a heater core installing portion 23 provided to the unit case 2, on the bottom surface side of the heating flow channel 10, and left and right shoulder portions 13A and 13B of an upper part of the heater core 13 are respectively supported by upper-part shoulder supporting portions 24 and 25 for the heater core that are respectively provided on side surfaces 2A and 2B of the unit case 2.

As illustrated in FIG. 4, the upper-part shoulder supporting portions 24 and 25 of the heater core are respectively formed integrally with an inner surface of the unit case 2 made of the resin so as to protrude inward by a predetermined length respectively from the left and right side surfaces 2A and 2B of the unit case 2, and the upper-part shoulder supporting portions 24 and 25 for the heater core respectively support only the upper-part left and right shoulder portions 13A and 13B of the heater core 13 placed on the heater core installing portion 23. Leading end parts of the upper-part shoulder supporting portions 24 and 25 for the heater core have a C-channel shape in cross-section, and the upper-part shoulder supporting portions 24 and 25 for the heater core include holding surfaces 26, 27, 28, and 29 that respectively hold an upper surface, end surfaces, and front and back side surfaces of the upper-part left and right shoulder portions 13A and 13B of the heater core 13.

Figure 5:
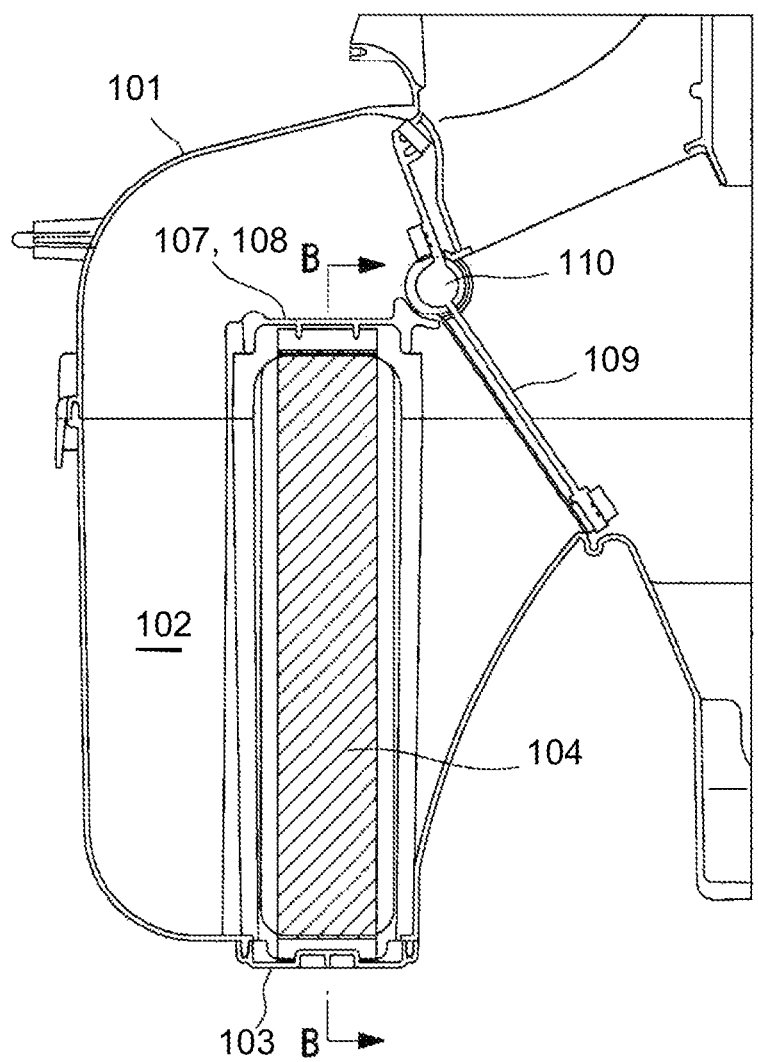
FIG. 5 is a longitudinal sectional view around a heater core of a conventional air regulating device for a vehicle.
Figure 6:
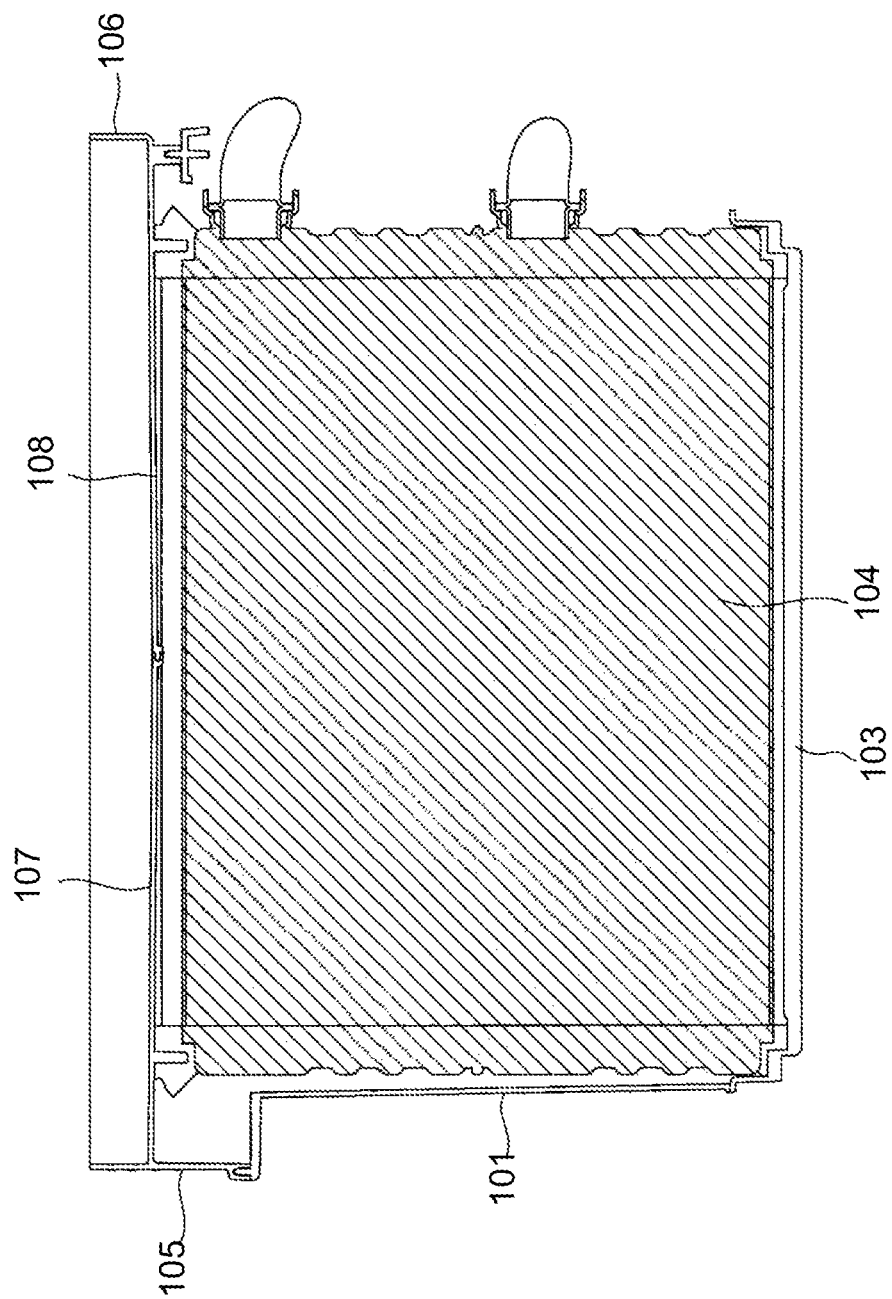
FIG. 6 is a sectional view taken along a line B-B in FIG. 5.

Because the upper-part shoulder supporting portions 24 and 25 for the heater core respectively support only the upper-part left and right shoulder portions 13A and 13B of the heater core 13, a supporting wall that supports an entire surface of the upper part of the heater core 13 is not necessary. As a result, the thicknesses and the like of the upper-part shoulder supporting portions 24 and 25 for the heater core are reduced, so that the upper-part shoulder supporting portions 24 and 25 for the heater core and the rotating shaft 12 of the air mixing damper 11 are made closer to each other accordingly. That is, as is apparent from the comparison between FIG. 3 and of FIG. 5, a distance between the heater core 13 and the rotating shaft 12 of the air mixing damper 11 is reduced by approximately 10 mm in each of the top-bottom direction and the front-back direction.

The above-mentioned configuration according to the present embodiment produces the following actions and operations.

The air flow fed from the blower unit 3 into the air flow channel 7 is cooled by heat exchange with a refrigerant while passing through the evaporator 8. Then, part of the air flow is circulated into the bypass flow channel 9, and another part thereof is circulated into the heating flow channel 10. In the air mixing region 14, warm air that has been heated by the heater core 13 in the heating flow channel 10 is mixed with cool air that has passed through the bypass flow channel 9, whereby temperature-conditioned air having a set temperature is obtained. After that, the temperature-conditioned air is blown off into the chamber from any of the face blow-off channel 15, the foot blow-off channel 16, and the defroster blow-off channel 17 that is selected by opening/closing the defroster/face damper 18 and the foot damper 19. Consequently, the temperature-conditioned air is used for air conditioning in the chamber.

The heater core 13 that heats the air flow divided into the heating flow channel 10 increases the temperature of the air flow by heat exchange between high-temperature cooling water and the air flow, the high-temperature cooling water being circulated from the engine cooling water circuit. The heater core 13 is substantially vertically disposed so as to run across the heating flow channel 10. The heater core 13 is installed so as to be placed on the heater core installing portion 23 provided on the bottom surface side of the heating flow channel 10, and only the left and right shoulder portions 13A and 13B of the upper part of the heater core 13 are respectively supported by the upper-part shoulder supporting portions 24 and 25 for the heater core that are respectively provided on the left and right side surfaces 2A and 2B of the unit case 2.

As described above, the upper part of the heater core 13 is supported by the upper-part shoulder supporting portions 24 and 25 for the heater core that have the C-channel shape in cross-section, are respectively provided on the left and right side surfaces 2A and 2B of the unit case 2, and include the holding surfaces 26, 27, 28, and 29 that hold only the upper surface, the end surfaces, and the front and back side surfaces of the left and right shoulder portions 13A and 13B.

With this configuration, the heater core 13 can be placed and fixedly supported at a predetermined position in the heating flow channel 10 in the state where at least four shoulder portions thereof are supported.

Accordingly, without the need to provide, on the side surfaces of the unit case 2, a wall that is extended over the entire length in the width direction and supports the entire surface of the upper part of the heater core 13, the heater core 13 can be fixedly installed reliably in the heating flow channel 10. As a result, it is possible to simplify the configuration of the unit case 2, facilitate the formation thereof, and reduce the weight and costs thereof by reducing the amount of used resin.

In addition, because the supporting wall that supports the entire surface of the upper part of the heater core 13 is not necessary, the heater core 13 and the rotating shaft 12 of the air mixing damper 11 can be made closer to each other, so that the size of the unit case 2, eventually, the size of the HVAC unit 1 can be reduced accordingly in each of the top-bottom direction and the front-back direction. As a result, it is possible to make the HVAC unit 1 compact and reduce the weight thereof, to thereby enhance properties thereof for mounting on a vehicle.

Incidentally, it is confirmed as a result of rough calculation that the length in each of the top-bottom direction and the front-back direction of the HVAC unit 1 can be reduced by approximately 10 mm. As described above, it is confirmed that even the configuration in which the upper-part shoulder supporting portions 24 and 25 for the heater core are respectively provided on only the side surfaces 2A and 2B of the unit case 2 does not cause any problem in defining the air flow channel 7.

In addition, the upper-part shoulder supporting portions 24 and 25 for the heater core are respectively formed integrally with the left and right side surfaces 2A and 2B of the unit case 2. Hence, it is sufficient to integrally form, in the unit case 2, the upper-part shoulder supporting portions 24 and 25 for the heater core that respectively support only the upper-part left and right shoulder portions 13A and 13B of the heater core 13 and each have a small amount of protrusion, instead of a supporting portion that supports the entire surface of the upper part of the heater core 13, and a portion having a large thickness does not need to be provided in the root portion. As a result, the draft angle thereof can be made closer to substantially 0°, and cooling time during the formation can be shortened. Accordingly, it is possible to facilitate the formation of the unit case 2 using a resin material and improve the productivity thereof.

Further, the upper-part shoulder supporting portions 24 and 25 for the heater core include the holding surfaces 26, 27, 28, and 29 that respectively hold the upper surface, the end surfaces, and the front and back side surfaces of the upper-part left and right shoulder portions 13A and 13B of the heater core 13 and have the C-channel shape in cross-section. Hence, the upper surface, the end surfaces, and the front and back side surfaces of the upper-part left and right shoulder portions 13A and 13B of the heater core 13 are respectively held by the four holding surfaces 26, 27, 28, and 29 having the C-channel shape, whereby the upper part of the heater core 13 can be supported by the two side surfaces of the unit case 2. Accordingly, the heater core 13 can be fixedly supported reliably at a predetermined position in the heating flow channel 10, even without the supporting wall that supports the entire surface of the upper part of the heater core 13.

The present invention is not limited to the invention according to the above-mentioned embodiment, and can be modified as appropriate within a range that does not depart from the gist thereof. For example, in the above-mentioned embodiment, description is given of the example in which the heater core 13 is substantially vertically disposed, but as a matter of course, the heater core 13 does not necessarily need to be vertically disposed and may be obliquely disposed.

The unit case 2 is configured by integrally coupling the plurality of divided cases, but how to divide the cases is not particularly limited. The upper-part shoulder supporting portions 24 and 25 for the heater core may be formed integrally with appropriate divided cases corresponding to a position at which the heater core 13 is installed. Further, it goes without saying that how to dispose the HVAC unit 1 and the blower unit 3 can be variously modified.

REFERENCE SIGNS LIST 1 vehicle air conditioning device (HVAC unit)
2 unit case
2A, 2B left and right side surfaces
7 air flow channel
9 bypass flow channel
10 heating flow channel
13 heater core
13A, 13B upper-part left and right shoulder portions
23 heater core installing portion
24, 25 upper-part shoulder supporting portions for heater core
26, 27, 28, 29 holding surfaces

The invention claimed is:

1. A vehicle air conditioning device, comprising:
a unit case including an air flow channel formed therein, the air flow channel being branched into a bypass flow channel and a heating flow channel; and
a heater core installed on a bottom surface side of the heating flow channel, the heater core including upper-part right and left shoulder portions;
wherein the unit case includes upper-part shoulder supporting portions for the heater core, each of the upper-part shoulder supporting portions for the heater core being respectively formed integrally with right and left side inner surfaces of the unit case and protruding by a predetermined length from the right and left side surfaces of the unit case, respectively, toward the upper-part right and left shoulder portions of the heater core, respectively, the predetermined length being a length to support only the upper-part left and right shoulder portions of the heater core and not an entire surface of an upper part of the heater core,
wherein only a projecting end of each of the upper-part shoulder supporting portions for the heater core formed integrally with the unit case has a C-channel shape in cross-section consisting of an upper-surface holding surface, a front-side-surface holding surface, and a back-side-surface holding surface,
wherein each of the upper-surface holding surface, the front-side-surface holding surface, and the back-side-surface holding surface only supports an upper surface, an upper part of a front side surface, and an upper part of back side surface of the upper-part right and left shoulder portions of the heater core, respectively,
wherein the upper-part shoulder supporting portions for the heater core do not support right and left end surfaces of the heater core, and
wherein the vehicle air conditioning device blowing off, into a chamber, an air flow made after joining together an air flow that has passed through the heating flow channel and an air flow that has passed through the bypass flow channel.

* * * * *